United States Patent [19]

Paxon

[11] Patent Number: 5,300,983
[45] Date of Patent: Apr. 5, 1994

[54] IMAGE SHIFTING BY CONTROL PATCH

[75] Inventor: James F. Paxon, Rochester, N.Y.

[73] Assignee: Eastman Kodak Company, Rochester, N.Y.

[21] Appl. No.: 956,210

[22] Filed: Oct. 5, 1992

[51] Int. Cl.$^5$ .......................................... G03G 21/00
[52] U.S. Cl. ..................... 355/208; 355/203; 355/326 R; 355/327; 250/548; 250/549; 250/491.1
[58] Field of Search ............. 355/203, 204, 208, 212, 355/213, 327, 326; 250/548, 559, 491.1

[56] References Cited

U.S. PATENT DOCUMENTS

| | | | |
|---|---|---|---|
| 3,979,115 | 9/1976 | Bruckner et al. | 271/261 |
| 4,201,378 | 5/1980 | Hams | 271/261 |
| 4,245,836 | 1/1981 | Joosten | 271/228 |
| 4,400,085 | 8/1983 | Nezu | 355/76 |
| 4,438,917 | 3/1984 | Janssen et al. | 271/227 |
| 4,511,242 | 4/1985 | Ashbee et al. | 355/200 X |
| 4,518,862 | 5/1985 | Dorn | 250/261 |
| 4,657,239 | 4/1987 | Ikesue et al. | 271/227 |
| 4,731,622 | 3/1988 | Hicks et al. | 346/157 |
| 4,821,066 | 4/1989 | Foote, Jr. et al. | 346/157 X |
| 4,829,326 | 5/1989 | Emmett et al. | 346/157 |
| 4,912,491 | 3/1990 | Hoshino et al. | 346/160 |
| 4,937,664 | 6/1990 | Chiku et al. | 355/327 X |
| 4,961,089 | 10/1990 | Jamzadeh | 355/207 |
| 4,963,899 | 10/1990 | Resch, III | 346/157 |
| 4,980,723 | 12/1990 | Buddendeck et al. | 355/212 X |
| 5,025,269 | 6/1991 | Saeki et al. | 346/157 X |
| 5,040,003 | 8/1991 | Willis | 346/157 |
| 5,175,570 | 12/1992 | Haneda et al. | 346/160 |
| 5,200,285 | 4/1993 | Carrish | 346/157 X |
| 5,208,796 | 5/1993 | Wong et al. | 250/548 X |

Primary Examiner—Matthew S. Smith
Attorney, Agent, or Firm—Leonard W. Treash

[57] ABSTRACT

Method and apparatus for control of cross-track registration of a web member in an image forming apparatus, such as a photocopier or printer. A control patch is laid down on the web member and toned. After toning, the amount of toner for a particular section of the control patch is sensed and compared with known amounts of toner to determine the cross-track position of the web. Once the cross-track position is determined, a printhead is programmed to alter the web lay-down location, of an image to be reproduced, to adjust for the actual cross-track location of the web.

4 Claims, 2 Drawing Sheets

IMAGE SHIFTING BY CONTROL PATCH

BACKGROUND OF THE INVENTION

1. Field of the Invention

This invention relates, in general, to photocopying and, more specifically, to control of cross-track registration in image forming apparatus and like devices.

2. Description of the Prior Art

In high speed electrostatographic reproduction apparatus, it is common practice to employ an elongated photoconductive belt or web adapted to record transferable images while the web is moving in a path in operative relation with various process stations. Typically, the web is supported by, and driven about, a series of rollers. With such a roller support system, there is a tendency for the moving web to shift laterally, or cross-track, with respect to such rollers. Various apparatus for correcting such lateral shifting of roller supported webs are known, such as crowned rollers, flanged rollers, servo-actuated steering rollers, or self-actuated steering rollers. Crowned rollers generally are not preferred for use with a web in an electrostatographic reproduction apparatus because they have a tendance to force the web toward the apex of such rollers, cause distortion of the web, and produce local stresses in the web, at the crown, which can damage the web. Flanged rollers generally are not preferred because they produce a concentrated loading at the edges of the web resulting in edge buckling, seam splitting, or excessive edge wear.

Electrostatographic reproduction apparatus, therefore, typically utilize servo-actuated or self-activated steering rollers. While such steering rollers generally correct the cross-track shifting of the web, the realignment tends to be at an uneven rate and inconsistent from one correction to the next correction resulting in the production of image frames which do not match or register.

A further problem of known servo-actuated or self-activated steering roller tracking systems is that they usually react to the absolute lateral position of the edge of the web, rather than to the actual lateral position of the web. Because the web edge is typically irregular, any misregistration due to other mechanisms, such as described hereinabove, is thereby compounded by the edge irregularity which increases, due to wear, during the web's operational life.

Efforts to correct the above problems have been made, as disclosed in the steering mechanism of U.S. Pat. No. 4,961,089; however, belt travel corrections still have not been perfected.

SUMMARY OF THE INVENTION

In is an object, therefore, of the present invention to provide a method and apparatus for web tracking that adjust the latent image writing system to the actual lateral position of the web in a timely and consistent manner.

In is a further object to use the method and apparatus, of the present invention, with or without the prior art web tracking and steering methods and apparatus.

The above objects are accomplished by a new and useful apparatus and system for generating data from a control patch on a charge-retaining member, such as a web, to determine cross-track position of the web when said web is used in an image forming apparatus, photocopier or printer. One specific embodiment of the invention being an apparatus for positioning a latent image upon a web moving along a path, the web being subject to lateral movement in a direction transverse to the direction of movement of said web along said path, the apparatus comprising:

means for monitoring the lateral position of the web and generating a first signal in response thereto; and means responsive to said first signal for generating a second signal for controlling the positioning of the latent image upon the web.

Further advantages and uses of this invention will become more apparent when considered in view of the following detailed description and drawings.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Figure 1:
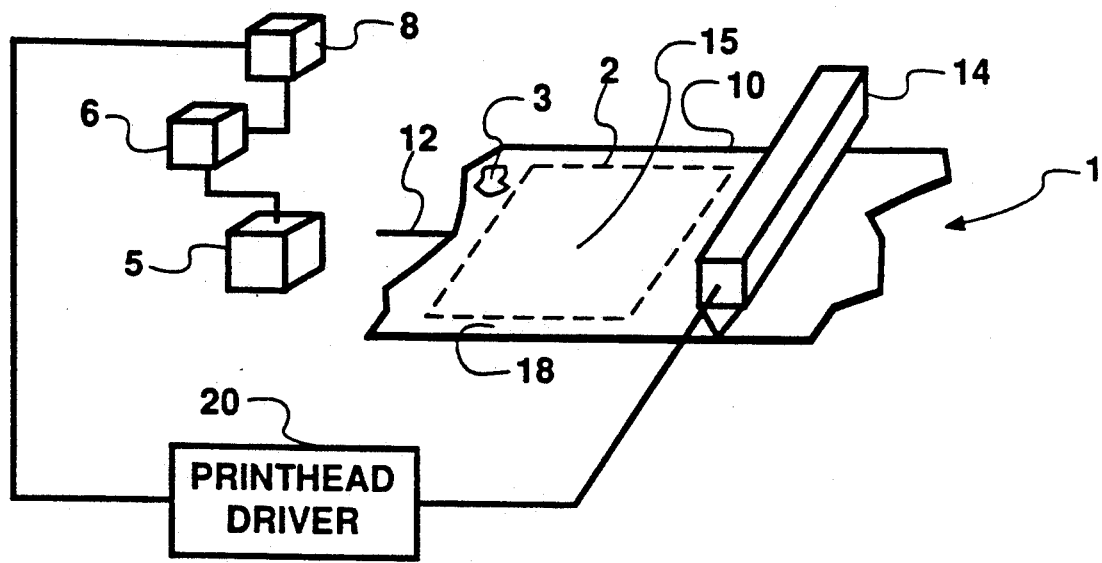
FIG. 1 is a diagram illustrating the relative physical positions of important components of this invention.

The apparatus of the preferred embodiment will be described in accordance with an electrostatographic recording medium. The invention, however, is not limited to methods and apparatus for creating images on such a medium, as other media such as photographic film, etc. may also be used to advantage within the spirit of the invention.

Because electrostatographic reproduction apparatus are well known, the present description will be directed in particular to elements forming part of, or cooperating more directly with, the present invention. Apparatus not specifically shown or described herein are selectable from those known in the art.

While the present invention is susceptible to embodiments of many different forms, there is shown in the drawings and hereinafter described, in detail, a preferred embodiment of the invention. It should be understood, however, that the present disclosure is to be considered an exemplification of the principles of the invention and is not intended to limit the invention to the embodiments illustrated and/or described.

For ease of description, all apparatus will be described in their normal operational position, and terms such as upper, lower, horizontal, etc., will be used with reference to normal operating positions. All apparatus, however, may be manufactured, stored, transported and sold in an orientation other than the normal operational positions described.

All references cited in this specification and their references are incorporated by reference herein where appropriate, for appropriate teaching of additional or alternative details, features and/or technical background.

Throughout the following description, similar reference characters refer to similar elements or members in all of the drawing figures.

Figure 2:
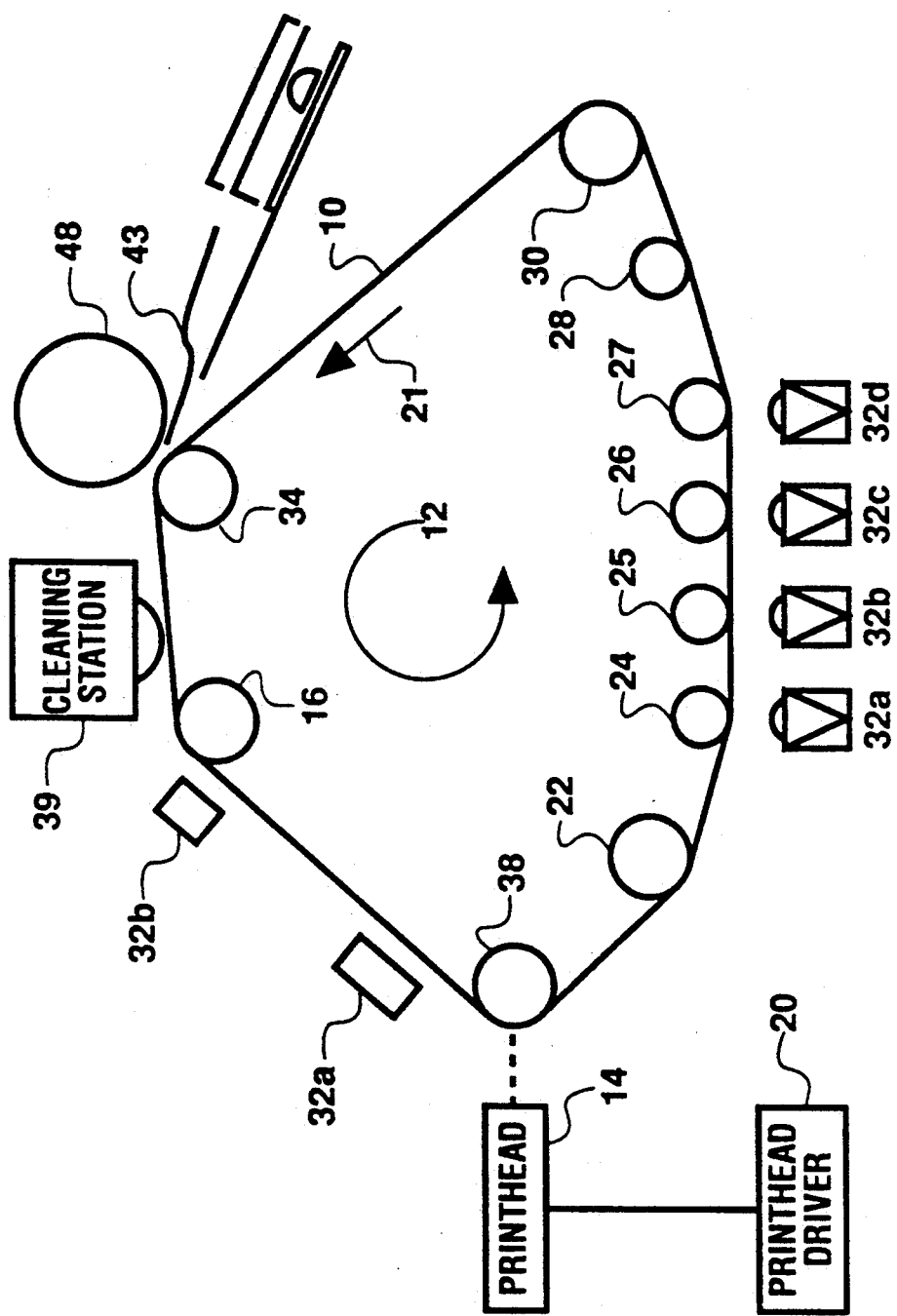
FIG. 2 is a diagram illustrating a web path of a typical prior art electrostatographic reproduction apparatus.

Referring now to the drawings, and to FIG. 2 in particular, there is shown a diagram illustrating the relative locations of the items of a typical prior art electrostatographic reproduction apparatus 1. In electrostatographic reproduction apparatus 1, a photosensitive member 10, such as an endless web or belt, moves in the direction of arrow 21 over a closed loop path 12 with respect to a printhead 14. Photosensitive web 10 is of the charge-retaining type wherein latent images thereon are created by controlling the amount of charge on web 10, either by placing a charge directly on web 1 0 or reducing the charge, on web 1 0, at specific locations by suitable devices or light exposure. As web 10, travels about closed loop path 12, it is typically supported by a transfer backup roller 34, an idler roller 16, a drive roller 38, which typically drives web 10 through a series of perforations, as disclosed in U.S. Pat. No. 4,821,066, while also preventing to a certain extent lateral movement of web 10 where the teeth, not shown, of drive roller 38 mesh with the perforation of web 10. Web 10 is also supported by a tension roller 22, multiple guide rollers 24, 25, 26, 27 and 28, and a steering roller 30. Closed loop path 12 also has associated with it the typical electrophotographic process stations, such as primary and auxiliary charging stations 32a and 32b, printhead 14, development stations 36a, 36b, 36c and 36d, a transfer station 48, a cleaning station 39 and an erase lamp 41, all for producing an image on a receiver member 43, such as a sheet of paper or transparency.

Referring now to FIG. 1, area 2 represents that portion of web 10 which is preferably allocated or designed to receive a latent information image 15 that is later to be toned and transferred to receiver 43 (see FIG. 2). Area 18, the space surrounding area 2, is the preferred area allocated or designated to receive a latent image of a control patch 3, which can be in the shape of an isosceles triangle (see FIGS. 3 and 4). Control patch 3, as hereinafter described, is used to monitor the tracking of web 10 in accordance with the present invention.

The latent images for information image 15 and control patch 3 are formed at different times on web 10, but both the latent image for information image 15 and for control patch 3 are formed on web 10 by printhead 14. Printhead 14 forms these latent images through selective control of light-emitting diodes, not shown, but known in the art, within printhead 14. The control of the individual diodes, of printhead 14, is provided by a printhead driver 20, such as a computer or other known appropriate source of image data or signal input generation. Printhead driver 20 causes the diodes, in printhead 14, to modulate and produce a light beam that produces the latent image of information image 15, in area 2, of web 10, and the latent image of control patch 3, in area 18, of web 10 (see FIG. 3). Once the latent image of control patch 3 is produced or written, on web 10, the latent image of control patch 3 is toned. As to be later described, a toner reading of control patch 3 is then analyzed to determine the cross-track position of web 10. Upon determination of the cross-track position of web 10, printhead driver 20 signals printhead 14, to alter its position for writing latent information image 15, on web 10, to compensate for the actual cross-track position of web 10, as determined from the reading of control patch 3.

Figure 4:
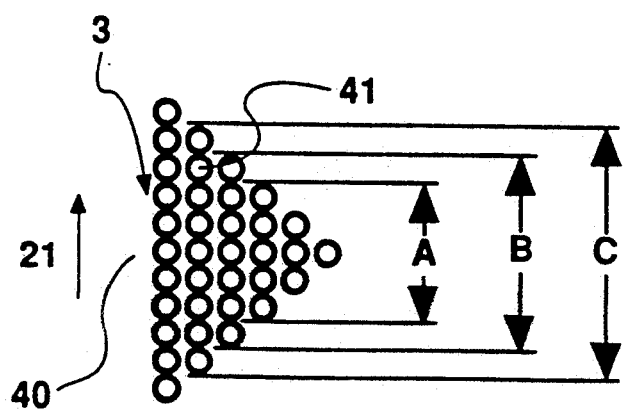
FIG. 4 is a partial, enlarged view of the control patch showing a particular pixel pattern.

Referring now to FIG. 4, a number of pixels 41 form control patch 3 in the shape of an isosceles triangle having a base 40 parallel to the in-track direction of web 10. Pixels 41, of control patch 3, are grouped into sections, such as A, B and C, shown in parallel arrangement, but any other arrangement, such as 0 may be used, with each section, due to the difference in the number of pixels 41 forming said section, requiring a different amount of toner to develop said sections. As later to be explained, each section of control patch 3 represents a specific cross-track position of web 10. The preferred size, of control patch 3, is approximately a half inch square, so that the various sections of control patch 3 may be easily identified, but are small enough that the size of control patch 3 will not impinge on area 2, of web 10, and cause unwanted images to appear on any hard copy image produced by image forming apparatus 1.

Figure 3:
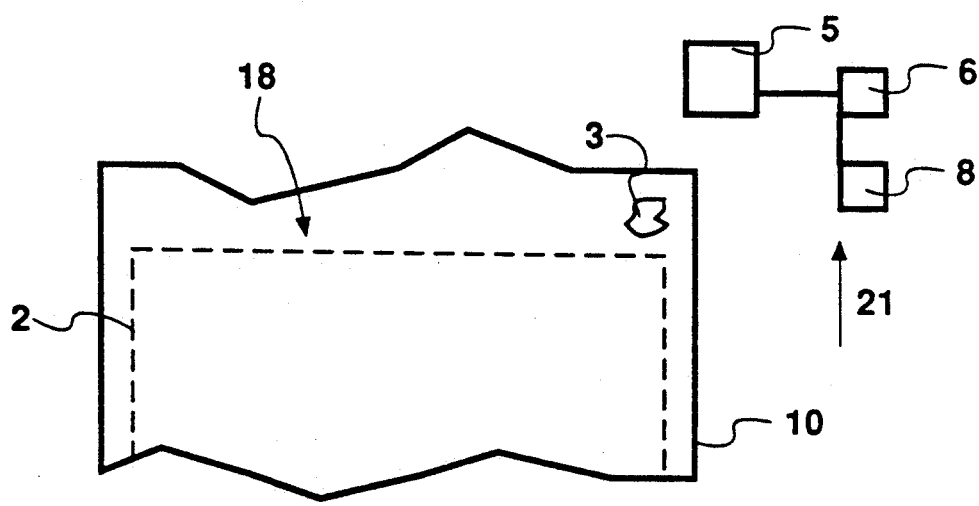
FIG. 3 is a diagram illustrating the position of the control patch on a photoconductive web.

While control patch 3, in the above specified embodiment of the present invention, is depicted as an isosceles triangle having its base parallel to the intrack web direction and a size of one-half square inch, consisting of three sections and located in area 18, of web 10, control patch 3 may be of any shape and size, have any number of sections and be located anywhere on web 10 as long as it is capable of being read by a stationary sensor 5 (see FIGS. 1 and 3). The above parameters, of control patch 3, may be easily modified, to one's preference, by merely down loading, as is known in the art and disclosed in U.S. Pat. No. 4,961,089, to printhead 14, the data necessary to form the desired size, shape, number of sections and location of control patch 3. Any change, however, in the parameters of control patch 3 must be accompanied by a corresponding change, in the later to be discussed, baseline data bank, so that a proper comparison, with indexed toner readings, may be made for determining cross-track position of web 10.

Once the shape, size, number of sections, arrangement of sections and location of control patch 3 is determined and the latent image of control patch 3 is written on web 10. Control patch 3, as previously stated, is toned by one of developing stations 36a, 36b, 36c or 36d. Thereafter, since control patch 3 travels with the traverse and lateral movement of web 10, as web 10 traverses path 12, only a single arrangement of pixels defining a particular section of toned control patch 3, will be aligned to pass under and be read by stationary sensor 5, prior to control patch 3 being erased at cleaning station 39. The section that is so aligned will be determined by the cross-track position of web 10. A signal representing the amount of toner that sensor 5 senses or reads, on the section passing under it, is transmitted to a storage member 6. A logic and control network 8, such as a microprocessor, then accesses the transferred stored signal, in storage member 6, and compares the transferred stored signal with a set of indexed toner signals stored in the baseline data bank portion of storage member 6. The set of indexed toner signals being indexed such that there is a specific indexed toner signal corresponding to or representing each toner signal for the various toner signals that could be read for each particular section of control patch 3. Therefore, once a match is found between a transferred stored signal and an indexed toner signal, the section of control patch 3 that passed under sensor 5 is known. In addition, since the section of control patch 3 that passed under sensor 5 is directly related to the cross-track position of web 3, once the section of control patch 3 that passed under sensor 5 is known, the cross-track position of web 10 is also known.

With the establishing of the cross-track position of web 10, microprocessor 8 then transmits a signal to printhead driver 20, that causes specific LED's in printhead 14 to be turned on or off in a manner that moves the position where printhead 14 writes latent information image 15, on web 10, to compensate for the difference between the anticipated cross-track position of web 10 and the actual sensed cross-track position of web 10. An example of this is, if section A is the portion of control patch 3 that is read by sensor 5, as control patch 3 passes adjacent to sensor 5, a reading, such as "5" will be sensed or recorded, which reading of "5", when compared to the set of indexed toner readings would indicate that web 10 is tracking one pixel to the left and, therefore, any image to be toned for transfer to receiver 43 should be written by printhead 14 to compensate for said left tracking, such as writing latent information image 15 one pixel to the right on web 10. If, however, section C is the portion of control patch 3 that is read by sensor 5 as control patch 3 passes adjacent to sensor 5, a reading, such as "9" will be sensed or recorded, which reading of "9", when compared to the set of indexed toner readings would indicate that web 10 is tracking one pixel to the right and, therefore, any image to be toned for transfer to receiver 43 should be written by printhead 14 to compensate for said right tracking, such as writing information image 15 one pixel to the left on web 10.

If one desires to make finer adjustments then illustrated by the above examples, one need only divide control patch 3 into more than three sections, and use a sensor 5 that is able to accurately distinguish between the discrete differences in the amount of toner used in the additional sections of control patch 3, as control patch 3 passes under sensor 5. Those reading can then be compared with an equally discrete set of stored indexed reading for determining even minute web 10 cross-track variations. Therefore, as the sensitivity of sensor 5 and the number of divisions of control patch 3 increases, more exact compensation for cross-track positioning of web 10 and better registration for the toning of latent information image 15 and positioning of information image 15, may be achieved, when reproducing information image 15, onto receiver 43.

While control patch 3 can be written anywhere on web 10, in the preferred embodiment of the invention, printhead 14 is restricted to writing the latent image of control patch 3 in area 18, next to where latent information image 15 will be written in area 2. In this manner, and with image formation apparatus 1 also being restricted to only transferring and reproducing onto receiver 43, information contained in area 2, of web 10, only information image 15 and not the image of control patch 3, even if control patch 3 is not properly cleaned from web 10, will be transferred and reproduced onto receiver 43.

To insure that each latent information image 15, to be written, is properly located on web 10 for registration of color, if a color apparatus is being used, or for transfer to receiver 43, the above process of comparing toner amounts and adjusting the writing location accordingly, is repeated before each writing of a latent information image 15. By continually monitoring and adjusting for changes in cross-track position of web 10, proper registration of latent information image 15 with developing stations 36a, 36b, 36c and 36d, and transfer to receiver 43, is assured.

In operation, when electrostatographic reproduction apparatus I is powered up, web 10 begins to move about close path 12. As web 10 moves about close path 12, printhead 14, controlled by printhead driver 20, lays down, in area 18, of web 10, latent image control patch 3 in the form of an isosceles triangle (See FIG. 4). Latent image control patch 3 is then toned by any one of developing stations 36a, 36b, 36c or 36d, as web 10, containing control patch 3, passes adjacent to said stations. Upon being toned, only one particular section of control patch 3 passes under sensor 5 (see FIG. 3) which detects the amount of toner, on that particular section of toned triangular control patch 3, that passes under it, prior to being erased at cleaning station 39. It being understood that, the section of control patch 3 that passes under sensor 5 is directly dependant upon the cross-track position of web 10. The toner reading, sensed by sensor 5, is then sent to memory storage 6. Microprocessor 8 accesses memory 6 and compares the sensed toner reading to a set of indexed toner reading, indexed according to the amount of toner that would be sensed on control patch 3 for each section of control patch 3. Upon microprocessor 8 finding a match between the sensed reading and the indexed readings, the section of control patch 3 that passed under sensor 5 will be known, as will the cross track position of web 10. Microprocessor 8 then signals printhead driver 20, to control the operation of printhead 14 so that it compensates for the difference between the anticipated cross-track position of web 10 and the actual sensed cross-tract position of web 10, when printhead 14 writes latent information image 15, on web 10.

It is emphasized that numerous changes may be made in the above-described system without departing from the teachings of the invention. It is intended that all of the matter contained in the foregoing description, or shown in the accompanying drawings, shall be interpreted as illustrative rather than limiting.

I claim as my invention:

1. A method for positioning a latent image upon a web moving along a path, the web being subject to lateral movement in a direction transverse to the direction of movement of the web, and the method being usable in an image forming apparatus having means positioned adjacent the path for forming an image on the web, said method comprising the steps of:

forming a control patch having an density capable of being sensed on the web, said control patch having a shape the length of which in the direction of movement of the web varies laterally across the direction of movement, sensing the accumulated density of the patch as it passes a location that is laterally fixed with respect to the path, and adjusting the image formation means to position an image laterally on the belt according to the sensed accumulated density of the patch.

2. The method according to claim 1 wherein the step of forming a control patch is accomplished by the image forming means.

3. The method according to claim 2 wherein the web is an endless belt photoconductive image member, the means for forming includes means for uniformly charging the belt, electronic means for imagewise exposing the belt and means for toning an electrostatic image created on the belt.

4. The method according to claim 1 wherein the step of forming a control patch includes forming a control patch having a triangular shape with a base of the triangle parallel to the direction of movement.

* * * * *